(No Model.) 6 Sheets—Sheet 1.

W. E. BARNUM.
MACHINE FOR PUNCHING CHECKS.

No. 438,136. Patented Oct. 14, 1890.

Witnesses:
Robert A. Millar.
John L. Jackson

Inventor:
William E. Barnum
by Bond, Adams & Jones
Attys (No Model.) 6 Sheets—Sheet 2.

W. E. BARNUM.
MACHINE FOR PUNCHING CHECKS.

No. 438,136. Patented Oct. 14, 1890.

Witnesses:
Robert A. Millar
John L. Jackson

Inventor:
William E. Barnum
by Bond, Adams & Jones
Attys (No Model.)
6 Sheets—Sheet 3.

W. E. BARNUM.
MACHINE FOR PUNCHING CHECKS.

No. 438,136. Patented Oct. 14, 1890.

Witnesses:
Robert A. Millar.
John L. Jackson.

Inventor:
William E. Barnum
by Bond, Adams & Jones
Attys (No Model.) 6 Sheets—Sheet 4.

W. E. BARNUM.
MACHINE FOR PUNCHING CHECKS.

No. 438,136. Patented Oct. 14, 1890.

Witnesses:
Robert A. Miller
John L. Jackson

Inventor:
William E. Barnum
by Bond, Adams & Jones
Attys (No Model.) 6 Sheets—Sheet 5.
W. E. BARNUM.
MACHINE FOR PUNCHING CHECKS.
No. 438,136. Patented Oct. 14, 1890.
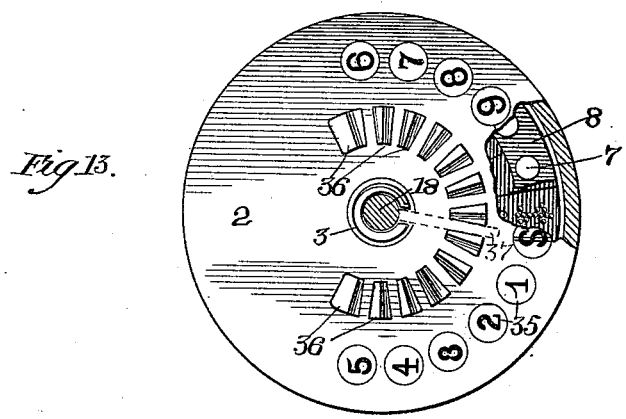
Fig. 13.
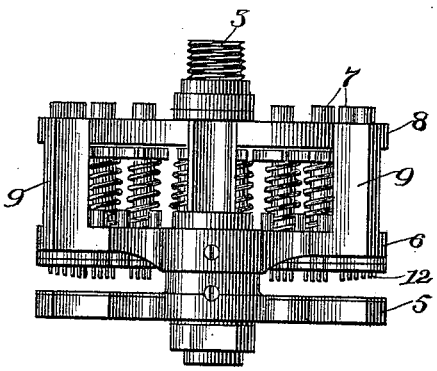
Fig. 14.
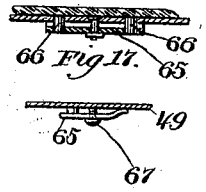
Fig. 16.
Fig. 17.
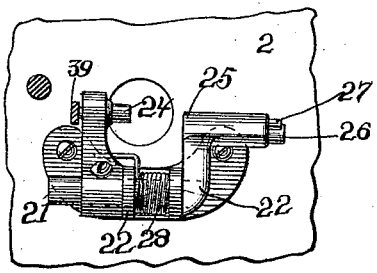
Fig. 15.
Witnesses:
Robert A. Millar
John D. Jackson
Inventor:
William E. Barnum
by Bond, Adams & Jones
Attys (No Model.)

W. E. BARNUM.
MACHINE FOR PUNCHING CHECKS.

No. 438,136. Patented Oct. 14, 1890.

6 Sheets—Sheet 6.

Witnesses:
John L. Jackson.
Charles Shewey.

Inventor:
William E. Barnum
by Bond, Adams & Jones
attys.

UNITED STATES PATENT OFFICE.

WILLIAM E. BARNUM, OF CHICAGO, ILLINOIS, ASSIGNOR TO ARCHELAUS G. WARNER, OF SAME PLACE.

MACHINE FOR PUNCHING CHECKS.

SPECIFICATION forming part of Letters Patent No. 438,136, dated October 14, 1890.

Application filed May 13, 1890. Serial No. 351,662. (No model.)

*To all whom it may concern:*

Be it known that I, WILLIAM E. BARNUM, residing at Chicago, in the county of Cook and State of Illinois, and a citizen of the United States, have invented a new and useful Improvement in Machines for Punching Checks, of which the following is a specification, reference being had to the accompanying drawings, in which—

Figure 1:
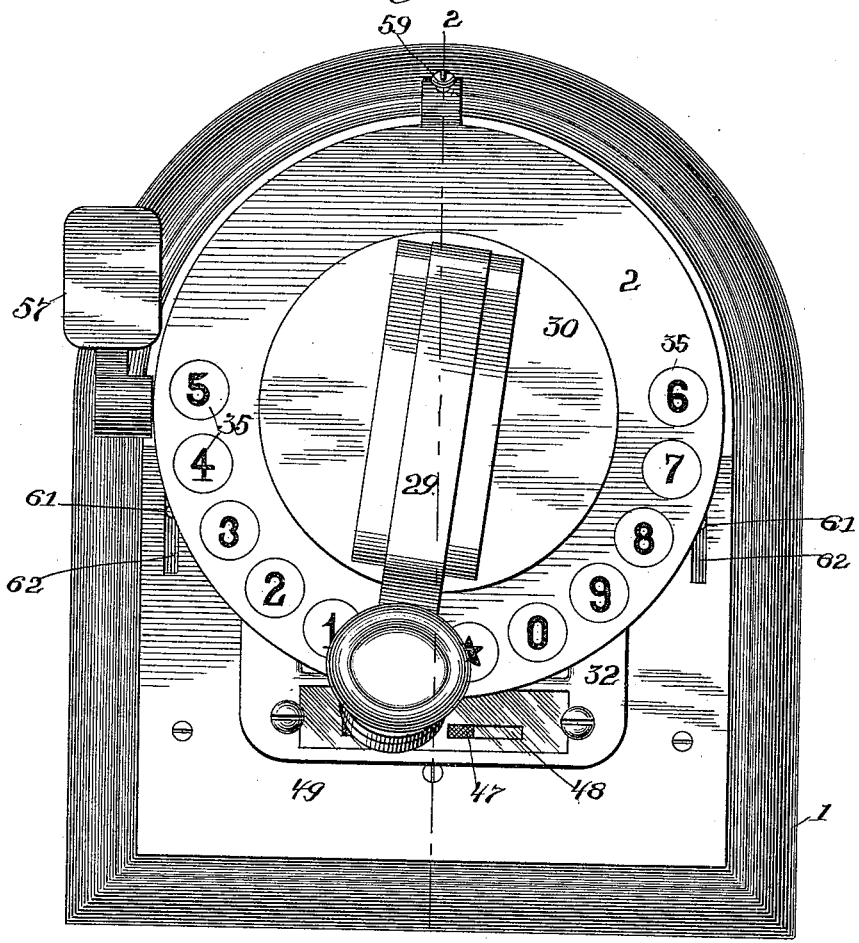
Figure 2:
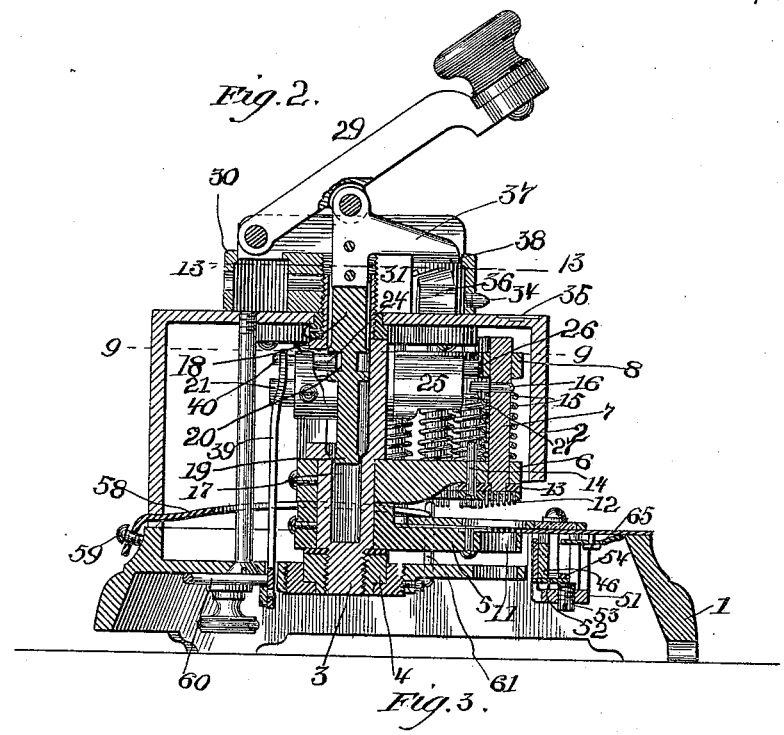
Figure 3:
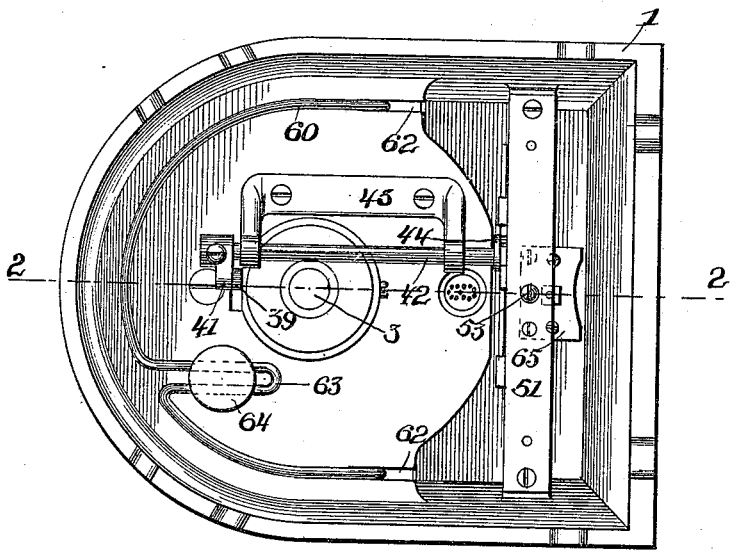
Figure 4:
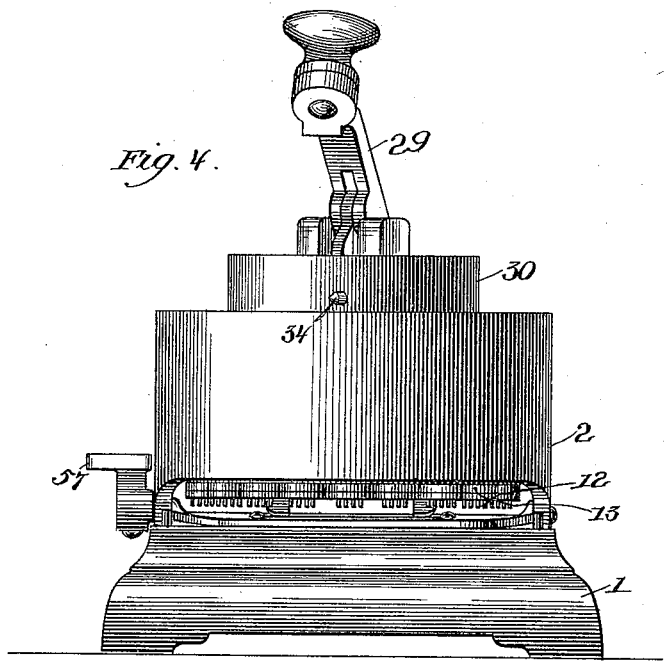
Figure 5:
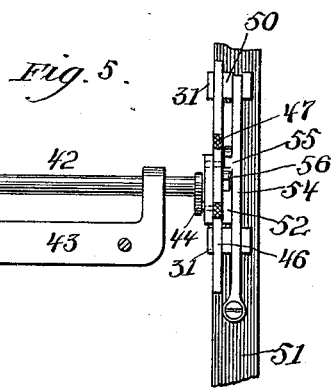
Figure 8:
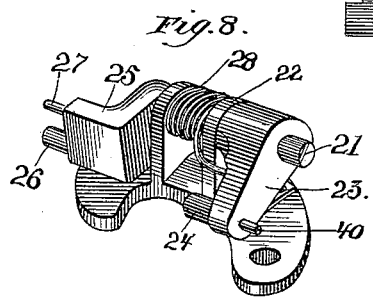
Figure 6:
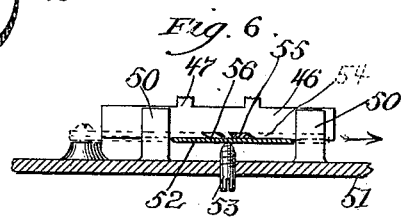
Figure 7:
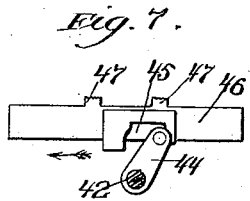
Figure 9:
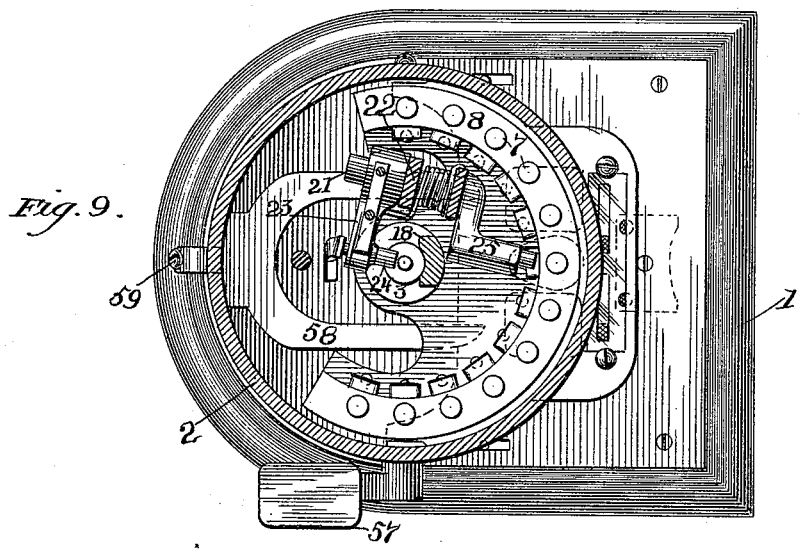
Figure 10:
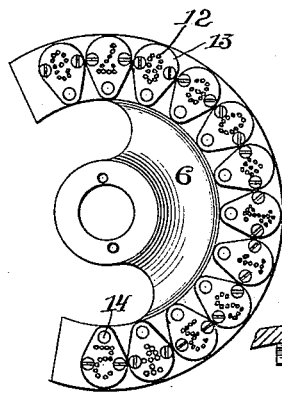
Figure 11:
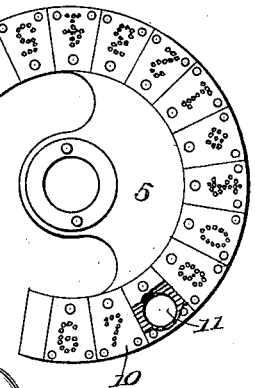
Figure 12:
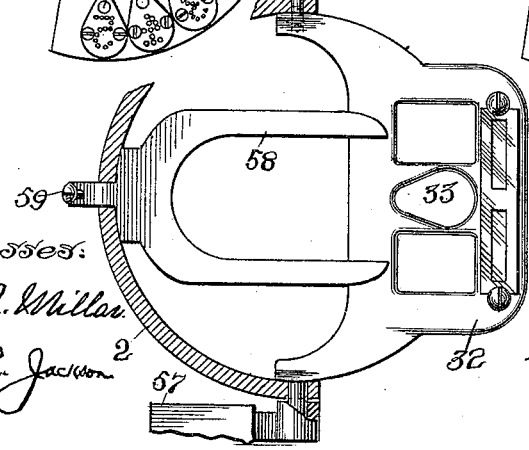
Figure 18:
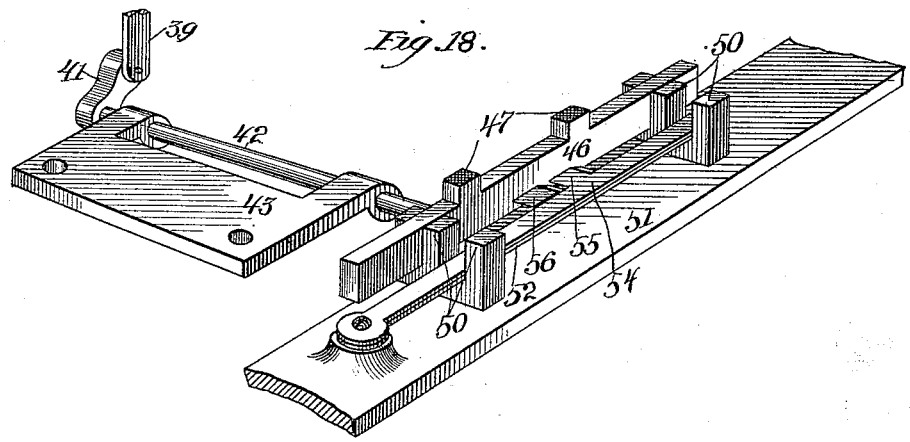
Figure 19:
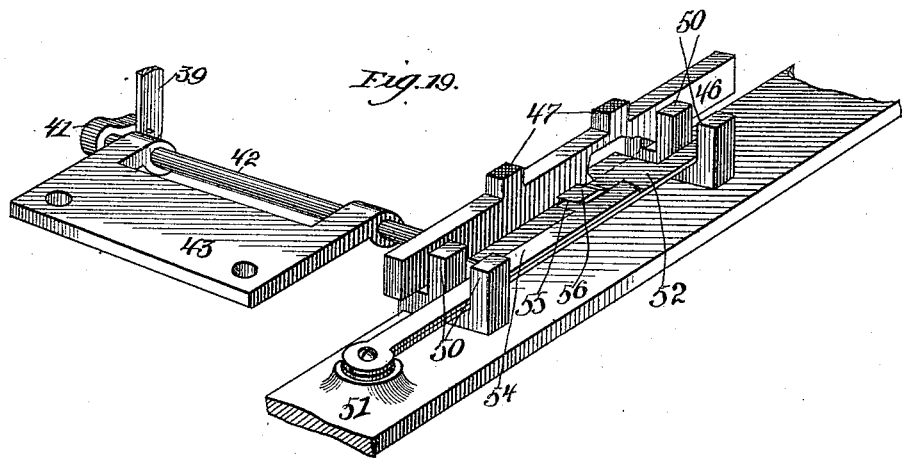

Figure 1 is a top or plan view. Fig. 2 is a vertical section at line 2 2 of Figs. 1 and 3. Fig. 3 is an under side view. Fig. 4 is a front elevation. Fig. 5 is a detail showing the feed mechanism and the devices for operating the same. Fig. 6 is a detail showing the feed mechanism and the adjusting device. Fig. 7 is a detail showing the connection between the feed mechanism and the rock-shaft. Fig. 8 is a detail, being a perspective view of the rock-shaft for operating the dies or punches. Fig. 9 is a horizontal section at line 9 9 of Fig. 2. Fig. 10 is a detail, being an under side view of the male dies or punches. Fig. 11 is a detail, being a plan view of the female dies. Fig. 12 is a detail showing presser-plate and its spring. Fig. 13 is a horizontal section at line 13 13 of Fig. 2, the shell being removed. Fig. 14 is a detail, being a side elevation of the movable frame. Fig. 15 is a detail, being an under side view of the rock-shaft for operating the dies. Figs. 16 and 17 are details showing the adjustable devices for holding a check. Fig. 18 is a detail, being a perspective view showing the feed mechanism, the parts being in their normal position; and Fig. 19 is a detail, being a perspective view similar to Fig. 18, showing the feed-plate moving in the direction to feed the check.

The object of this invention is to construct an improved machine for punching checks. The improvements will be more particularly hereinafter set forth, and pointed out in the claims.

In the drawings, 1 represents the base. This base may be made in any suitable or desired form to accommodate the devices hereinafter set forth.

2 represents the case for the operating parts, and is preferably made cylindrical.

3 represents a shaft, which is supported at its lower end in a suitable bearing 4 in the base 1 and its upper end in a suitable bearing in the case 2. To this shaft 4 is secured a frame, which carries the punches or male and female cutting-dies. This rotating frame consists of a lower plate 5, on which are secured female dies, a plate 6, in which are guided the lower ends of the stems 7 of the male dies, and a segment 8, in which are guided the upper ends of the stems 7. The segment 8 is connected with the plate 6 by posts 9. (Best shown in Fig. 14.) This frame is secured upon the shaft 3 and rotates therewith within the case 2.

The plate 5 is provided with a number of female dies 10. These dies 10 form a series of digits from "0" to "9," inclusive, and two characters, one a dollar sign and one a number sign, as best shown in Fig. 11. The plate 5 is also provided with a hole 11 beneath each die 10. Each male die consists in the form shown of a number of pins 12, which are secured in a plate 13, secured to the lower end of a stem 7. The dies 12 are arranged in series to correspond with the series of female dies 10. The forms of the dies may be varied to suit the form of the character to be punched. Each male die is provided with a pin 14, adapted to slide vertically in a hole in the plate 6 for the purpose of guiding the male die so that it will properly register with the female die.

Each stem 7 is provided with a return-spring 15, which abuts against the plate 6, and a pin 16, screwed into the stem. The inner ends of the pins 16 are flattened on the top and bottom, for purposes hereinafter set forth.

The lower portion of the shaft 3 is provided with a recess 17, as shown in Fig. 2. The shaft 3, about midway of its length, is open on one side.

18 is a shaft longitudinally movable within the shaft 3, as best shown in Fig. 2. This shaft 18 is provided with a head 19, adapted to slide vertically in the recess 17 in the shaft 3. The shaft 18 is provided with a groove 20 in that portion of its length which is within the open-sided portion of the shaft 3, as best shown in Fig. 2.

21 is a rock-shaft supported in a suitable bracket 22, depending from the upper portion of the case 2. One arm 23 of this rock-shaft 21 is provided with a pin 24, adapted to enter the groove 20 in the shaft 18. The longitudinal movement of the shaft 18 will rock the rock-shaft 21 through the pin 24 on the arm 23, and this motion will be communicated at any point in the rotation of the shaft 18. This rock-shaft 21 is provided with a second arm 25, (see Figs. 8 and 15,) which arm is provided with two pins, one 26 to engage with the upper side of one of the pins 16 in the stems 7 of the dies or punches, and the other pin 27 to engage with the under side of the pins 16. When the shaft 18 is moved longitudinally, it will rock the shaft 21 through the arm 23 and pin 24, thereby causing the pin 26 to engage with the upper side of the pin 16 on one of the stems 7, thereby moving the stem 7 and its die downward, and when the shaft 18 returns the pin 27 will engage with the under side of the pin 16, thereby raising the stem and its die. The rock-shaft 21 is provided with a return-spring 28, to return the rock-shaft to its normal position.

29 is an actuating-lever. This lever 29 is pivoted to a rotatable shell 30, which shell 30 is provided with a hub 31, which is screwed upon the shaft 3, as best shown in Fig. 2. The lever 29 is pivotally connected with the upper end of the shaft 18. The rotation of the shell 30 and lever 29, mounted thereon, will be communicated to the shaft 3 and through the shaft 3 to the frame which carries the dies or punches. The shaft 18 will be moved longitudinally within the shaft 3 by the actuation of the lever 29.

32 is a presser-plate by which the checks to be punched are to be held. This presser-plate is provided with an opening 33, through which the male die 12 moves.

In order to bring the proper dies 10 and 12 below and above the opening 33 in the presser-plate 32, the frame which carries the die must rotate in the case 2. It is rotated by means of the lever 29 and shell 30. The shell 30 is provided with a pointer 34, and the upper portion of the case 2 is provided with a series of numbers and characters 35, corresponding to the series of numbers and characters of the dies 10 and 12. When the shell 30 and the frame carrying the dies are rotated, the pointer 34 will point to the character 35, corresponding with the character of the dies 10 and 12, which are below and above the opening 33 in the presser-plate 32. When the lever 29 is pressed downward, the shaft 18 will be moved downwardly, which will rock the rock-shaft 21, as before described, and the pin 26 on the arm 25 of the rock-shaft 21 will engage with the pin 16 of the stems 7 of the die 12, which is above the opening 33, thereby actuating the die or punch, and the punch or die which is actuated will be indicated by the pointer 34.

In order to insure proper centering of the die 12 over the opening 33 in the presser-plate 32 and the punching of the character at the proper place in the check, I provide the case 2 with a series of blocks 36, as best shown in Fig. 13. The upper edges of these blocks 36 are beveled, and the spaces between the blocks 36 correspond with the proper positions of the frame for operating the dies or punches.

37 is an arm secured to the longitudinally-movable shaft 18 and provided with an edge 38, adapted to enter the spaces between the blocks 36. If the actuating-lever 29 is moved downward when the dies 10 and 12 are not properly centered below and above the opening 33 in the presser-plate 32, the edge 38 of the arm 37 will engage with the beveled face of one of the blocks 36, thereby rotating the shaft 3 and the frame carrying the dies to properly center the dies 10 and 12, thereby insuring the proper centering of the dies over and beneath the opening 33.

After each operation of the die the check or paper being punched must be moved the width of a character, which I accomplish by means of devices which I will now describe.

A link 39 is pivoted at one end upon a pin 40 on the arm 23 of the rock-shaft 21. The lower end of this link 39 is pivotally connected with an arm 41 of a rock-shaft 42. This rock-shaft 42 is supported in a bracket 43, depending from the under side of the base 1. The rock-shaft 42 is provided with a second arm 44, (see Fig. 7,) which enters a recess 45 in a feed-plate 46. This feed-plate 46 is provided with engaging-edges 47, which pass upward through a slot 48 in the feed-table 49. The feed-table 49 is a part of the base 1. This plate 46 slides longitudinally between guides 50, (see Figs. 5, 18, and 19,) which are supported upon a plate 51, secured to the under side of the base 1. The feed-plate 46 slides upon a supporting-bar 52, which bar 52 is secured to the plate 51 at one end, as shown in Figs. 6, 18, and 19. Its other end rests upon a set-screw 53, which passes through the plate 51, as shown in Fig. 6.

54 is a latch, which is provided with a lug 55, which lug 55 is adapted to engage with a lug 56 upon the feed-plate 46. The opposite sides of the lugs 55 and 56 are beveled, as best shown in Fig. 6, so that when the feed-plate 46 is moved to the right from the position shown in Figs. 6 and 18 its lug 56 will pass beneath the lug 55 upon the latch 54, and upon the return-stroke of the feed-plate 46 the lug 56 will pass above the lug 55, as shown in Fig. 19, thereby raising the feed-plate 46 until the lug 56 has passed the lug 55.

When the operator presses down upon the actuating-lever 29, the arm 23 on the rock-shaft 21 will be rocked downwardly, which will rock the arm 41 on the rock-shaft 42 downwardly. This will rock the arm 44 in the direction indicated by the arrow in Fig. 7, thereby moving the feed-plate 46 in the direction indicated by the arrow in Fig. 6. The lug 56 during such movement will pass beneath the lug 55 on the latch. When the operator releases the actuating-lever 29 and it returns to its normal position, the arm 23 on the rock-shaft 21 will be rocked upwardly, rocking the arm 41 on the rock-shaft 42 upwardly and the arm 44 in the reverse direction from that indicated by the arrow in Fig. 7, thereby returning the feed-plate 46. On this return-stroke the lug 56 will pass over the lug 55 on the latch 54, as shown in Fig. 19, thereby raising the feed-plate 46 sufficiently to bring its engaging edges 47 above the upper edge of the slot 48, thereby causing the engaging edges to engage with the check or paper being punched. When the feed-plate 46 has been returned, so that the lug 56 has passed the lug 55, as shown in Figs. 6 and 18, the plate 46 will drop, thereby disengaging the edges 47 from the check, leaving them in position for another operation.

From the description above given it is evident that upon the downward stroke of the actuating-lever 29 the feed-plate 46 is moved in one direction without engaging with the check. Upon the return movement of the actuating-lever 29 the feed-plate is moved in the opposite direction and raised sufficiently to engage with the check, thereby feeding the check the width of a single character, leaving it in readiness for a second operation. When the lug 56 passes above the lug 55 on the latch 54, the latch rests upon the bar 52. By raising or lowering the end of the bar 52 by means of the set-screw 53 the distance which the engaging-edges 47 will project above the surface of the feed-table 49 can be varied as may be desired. The check or paper being punched is held upon the table 49 by the presser-plate 32. This presser-plate 32 is provided with a lever 57, (see Figs. 1 and 12,) which is secured to one of the journals of the presser-plate 32, and by which the presser-plate can be raised for the purpose of inserting or removing a check or paper to be punched. The presser-plate 32 is pressed downward by a spring-plate 58. (Best shown in Fig. 12.) This spring-plate is forked, in order to press upon the presser-plate 32 on both sides of the central shaft, as shown in Fig. 9. The tension of the spring-plate 58 may be adjusted by means of a set-screw 59, which bears against the base 1.

In order to gage the distance to which checks or papers may be inserted beneath the presser-plate 32, I provide a gage consisting of a wire 60, bent in suitable form near its middle portion and having its ends 61 bent upwardly to pass through slots 62 in the base 1, so that the forward edge of the check will engage therewith when inserted beneath the presser-plate 32. The wire 60 is provided with a loop 63, adapted to be engaged by a set-screw 64, as best shown in Fig. 3. By loosening the screw 64 the wire 60 can be moved forward or back, thereby moving the ends 61 forward or back to vary the distance to which checks or papers can be inserted beneath the presser-plate.

65 (see Fig. 16) is a plate secured to the under side of the base 1 by a bolt or set-screw. This plate 65 is provided with pins 66, which project through openings in the table 49 a sufficient distance to engage the checks. The presser-plate 32 holds a check firmly upon these engaging-faces while the punching is being done. When the check is moved into position for the next operation by the feed-plate, the feed-plate raises the check from these pins 66. The distance which these pins 66 will project above the surface of the table 49 may be varied by means of set-screws 67.

What I claim as new, and desire to secure by Letters Patent, is—

1. In a machine for punching checks, the combination, with a rotating frame and a series of punches and dies carried thereby, of an actuating-lever, a longitudinally-movable shaft 18, and a rock-shaft arranged to operate a single die of the series from the longitudinal movement of the shaft 18, substantially as specified.

2. In a machine for punching checks, the combination, with a rotating frame and a series of punches carried thereby, of an actuating-lever, a rotating shell carrying said lever, a shaft 18, pivoted to said lever, a rock-shaft arranged to operate a single die of the series from the longitudinal movement of the shaft 18, a series of numbers, and a pointer 34 on the rotating case, substantially as and for the purpose specified.

3. In a machine for punching checks, the combination, with a rotating frame and a series of punches and dies carried thereby, of a rock-shaft, longitudinally-movable shaft 18, an actuating-lever, a presser-plate 32, having an opening 33, a series of blocks 36, and an arm 37, substantially as and for the purpose specified.

4. In a machine for punching checks, the combination, with a rotating frame and a series of punches and dies carried thereby, of an actuating-lever, a longitudinally-movable shaft, a rock-shaft arranged to operate a single die, an arm 23 on said rock-shaft, a link 39, and a check-feeding mechanism operated by said link, substantially as and for the purpose specified.

5. In a machine for punching checks, the combination, with a feed-plate 46, having a projection 56, of a latch 54, having a projection 55, and a supporting-bar 52, substantially as and for the purpose specified.

6. In a machine for punching checks, the combination, with a feed-plate 46, having a projection 56, of a latch 54, having a projection 55, a supporting-bar 52, and an adjusting-screw 53, substantially as and for the purpose specified.

7. In a machine for punching checks, the combination, with a rotating frame and a series of punches or dies carried thereby, of a rotatable and longitudinally-movable shaft 18, a rock-shaft 21, operated by said shaft 18 and arranged to operate a single punch or die, a link 39, pivotally connected with said rock-shaft, and a feed mechanism operated by said link, substantially as specified.

8. In a machine for punching checks, the combination, with a feed-table having slots 62, of a gage consisting of a wire having bent ends 61 passing through said slots, and an elongated loop 63 and a set-screw 64 passing through said loop, substantially as and for the purpose specified.

9. In a machine for punching checks, the combination of the rotatable shaft 18, having the projection or arm 37, and rotatable shell 30, with the fixed centering guide-blocks 36, substantially as specified.

WILLIAM E. BARNUM.

Witnesses:
A. G. WARNER,
HARRY T. JONES.